(12) United States Patent
Schwartz

(10) Patent No.: US 10,999,370 B1
(45) Date of Patent: May 4, 2021

(54) SYNCING AND SHARING DATA ACROSS SYSTEMS

(71) Applicant: Brian Schwartz, Potomac, MD (US)

(72) Inventor: Brian Schwartz, Potomac, MD (US)

(73) Assignee: BridgeLabs, Inc., San Francisco, CA (US)

( * ) Notice: Subject to any disclaimer, the term of this patent is extended or adjusted under 35 U.S.C. 154(b) by 0 days.

(21) Appl. No.: 16/923,581

(22) Filed: Jul. 8, 2020

Related U.S. Application Data

(63) Continuation-in-part of application No. 16/722,377, filed on Dec. 20, 2019.

(60) Provisional application No. 62/785,939, filed on Dec. 28, 2018.

(51) Int. Cl.
| | |
|---|---|
| *H04L 29/08* | (2006.01) |
| *G06F 16/13* | (2019.01) |
| *H04L 29/06* | (2006.01) |

(52) U.S. Cl.
CPC ........ *H04L 67/1095* (2013.01); *G06F 16/137* (2019.01); *H04L 63/102* (2013.01); *H04L 67/06* (2013.01); *H04L 67/1097* (2013.01); *H04L 67/42* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,785,704 B1 * | 8/2004 | McCanne | ......... | H04L 29/12047 718/105 |
| 2008/0177839 A1 * | 7/2008 | Chang | ..................... | H04L 67/38 709/205 |
| 2012/0069131 A1 * | 3/2012 | Abelow | ............... | G06Q 10/067 348/14.01 |
| 2015/0120662 A1 | 4/2015 | Dai et al. | | |
| 2015/0222625 A1 | 8/2015 | Ford et al. | | |
| 2016/0132526 A1 | 5/2016 | Hrebicek et al. | | |
| 2016/0253354 A1 | 9/2016 | Hrebicek et al. | | |
| 2017/0046807 A1 | 2/2017 | Ford | | |
| 2017/0364863 A1 | 12/2017 | Kessel et al. | | |
| 2018/0150475 A1 | 5/2018 | Hrebicek et al. | | |

(Continued)

OTHER PUBLICATIONS

U.S. Office Action from U.S. Appl. No. 16/722,377 dated Dec. 24, 2020 7 pages.

*Primary Examiner* — El Hadji M Sall

(74) *Attorney, Agent, or Firm* — Haynes Beffel and Wolfeld, LLP

(57) ABSTRACT

Systems and techniques are provided for syncing shared resource across multiple systems using an intermediary system. The system includes logic to store membership data that includes a plurality of members in a membership. The system includes logic to create a reference content hash for the shared resource of the membership. The system can download the content hash of a copy of shared resource, upon receiving a notification of a transaction with the copy of the shared resource. The system can compare the content hash of the copy with the content hash of the master copy to detect any changes to the copy of shared resource. The system can designate the copy of shared resource with updated content as master copy and fanout the master copy to storage accounts associated with members in the membership. The system can perform the fanout for sets of members in the membership.

30 Claims, 11 Drawing Sheets

(56) References Cited

U.S. PATENT DOCUMENTS

2018/0176207 A1 6/2018 Malatesha et al.
2019/0000360 A1 1/2019 Cole et al.
2019/0014167 A1 1/2019 Rao et al.
2019/0208014 A1* 7/2019 Goldberg ............ G06F 16/1827

* cited by examiner

SYNCING AND SHARING DATA ACROSS SYSTEMS

PRIORITY APPLICATION

This application is a continuation-in-part of U.S. patent application Ser. No. 16/722,377, filed 20 Dec. 2019, which claims the benefit of U.S. Provisional Patent Application No. 62/785,939 filed 28 Dec. 2018; both of which applications are incorporated herein by reference for all purposes, as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Field

The present invention relates to systems that manage sharing of data among multiple systems.

Description of Related Art

Sharing data across multiple data storage systems is a challenging problem because of differences in file systems, file identifiers, and interfaces for sharing and syncing of files. For example, consider two file storage systems, system one and system two. Consider a user with data stored in storage system one wants to share data with another user with storage account in storage system two. The system one user can share a file download link such as a uniform resource locator (URL) with the system two user. If this is not possible, the system one user can send an email containing a copy of the file to the system two user. Both the download link and the email can be forwarded to a wrong recipient, either negligently or maliciously. If the data is sent by email, current systems typically require the system one user to have the data stored locally, which can be impossible for devices with limited local memory. Email is also limited to only sending small amounts of data, which can make it impossible to use for sharing larger amounts of data.

Once the download link or the email is sent, current systems typically require the system two user to first download the data locally before the data can be uploaded to their system. This download and upload process can be both time consuming and error prone, especially for larger amounts of data, which can be impossible for devices with limited local memory. If the data is later updated by the system one user or the system two user, current systems typically require manually repeating one or more of the previous steps in order to keep everyone synced. Furthermore, if the data is later shared with more users, the previous steps can become impossible for everyone to coordinate. For the storage system one user that needs to share data with other users of storage system one, the storage system can provide sharing and syncing functionality. This requires the system one user to already know that everyone is on the same type of file storage system, which is often not the case and can be difficult to find out, especially when trying to share data between different organizations. Therefore, an opportunity arises for improved systems and methods for syncing and sharing data across different data storage systems.

It is desirable to provide a system that can more effectively and automatically share and sync data amongst multiple users with storage accounts on different data storage systems.

SUMMARY

A system, and method for operating a system, are provided for syncing a shared resource (also referred to as shared system resource or resource) across multiple systems using an intermediary system. The system can include a membership database that includes a plurality of members in a membership. A member in the membership is linked to a copy of the shared resource. The copy of the shared resource can be identified by a file identifier. The file identifier can be a combination of a sync identifier and a membership identifier of a member in the membership. The sync identifier is common for copies of all members in the membership. The system includes logic to create a reference content hash for the shared resource of the membership. The system includes logic to link to cloud-based storage accounts for members in the membership to receive notifications for transactions with respective copies of the shared system resource.

The system can link to users' accounts in storage systems such as cloud-based storage systems, and perform services for the users' accounts as a proxy for the user. The system includes logic to receive notifications for transactions with respective copies of the shared resource stored in storage systems. When the system receives the notification of transaction with a copy of the shared resource, the system can download the content hash of the copy of the shared resource for comparison with the reference content hash of the shared resource. When the system detects a change in the downloaded content hash, the system downloads the copy of the shared resource as a master copy or reference copy of the shared resource.

The system can fanout the master copy to update copies of shared resources of members in their respective cloud-based storage accounts. The system includes the logic to perform the fanout operations on subsets of members in the membership. Copies of shared resources of members in a first subset of members are updated by uploading the master copy to their respective accounts in storage systems. The system then repeats the selection of members in the subset and upload of master copy to accounts of members in the subset until copies of all members in the membership are updated.

In one embodiment described herein, fanning out the master copy can include initiating at least two parallel fan outs by downloading at least two updated copies of shared resource. The system can then use the two master copies to initiate separate fanout processes to update copies of shared resource of members in the membership. The system can use more than two master copies to initiate a higher number of fanout processes to update copies of shared resources of members in the membership.

The system can include logic to receive membership invite from a member in the plurality of members for a user to join a membership to collaborate on the shared resource. The system can send the membership invite to the user. The system can receive the membership invite message from the user in response to the membership invite. The system can then add the user to the membership database as a new member and download the shared resource to the cloud-based storage account linked to the new member.

The system can receive a notification of a new shared resource from a member in the membership for collaboration. Upon receiving the notification, the system can download a copy of the new shared resource from the cloud-based storage account of the member as a master copy to fanout to other members in the membership.

In one embodiment, the system can set policy for a member in the plurality of members in the membership. A policy can include access privileges for the member. The access privileges in the policy can allow the member to read content from the shared resource and write content to the shared resource (or allows the member to edit the shared resource). Another example of a policy can be read only access to the shared resource for a member in the membership. The system can set policies for groups of members in the membership. In this instance, all members in the group have the same level of access to the shared resource.

In one embodiment, linking to cloud-based storage accounts further includes accessing authorization data for members in the membership from a system account database to access the cloud-based storage accounts associated with the member.

The function of linking members to system accounts to access their storage accounts in different storage systems; receiving notifications of transactions with the copies of shared resources, and then fanning out the master copies to members in the membership presents a complex problem of computer engineering, relating to the type of user and storage accounts data to be processed, what processing of the user and storage accounts data to perform, and how to determine actions from the interactions of users (or transactions) with copies of shared resources in their respective storage accounts.

Methods and computer program products which can be executed by computer systems are also described herein.

Other aspects and advantages of the present invention can be seen on review of the drawings, the detailed description and the claims, which follow.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

A system and various implementations of the subject technology is described with reference to FIGS. 1A-9. The system and processes are described with reference to FIG. 1A, an architectural level schematic of a system in accordance with an implementation. Because FIG. 1A is an architectural diagram, certain details are omitted to improve the clarity of the description.

Figure 1A:
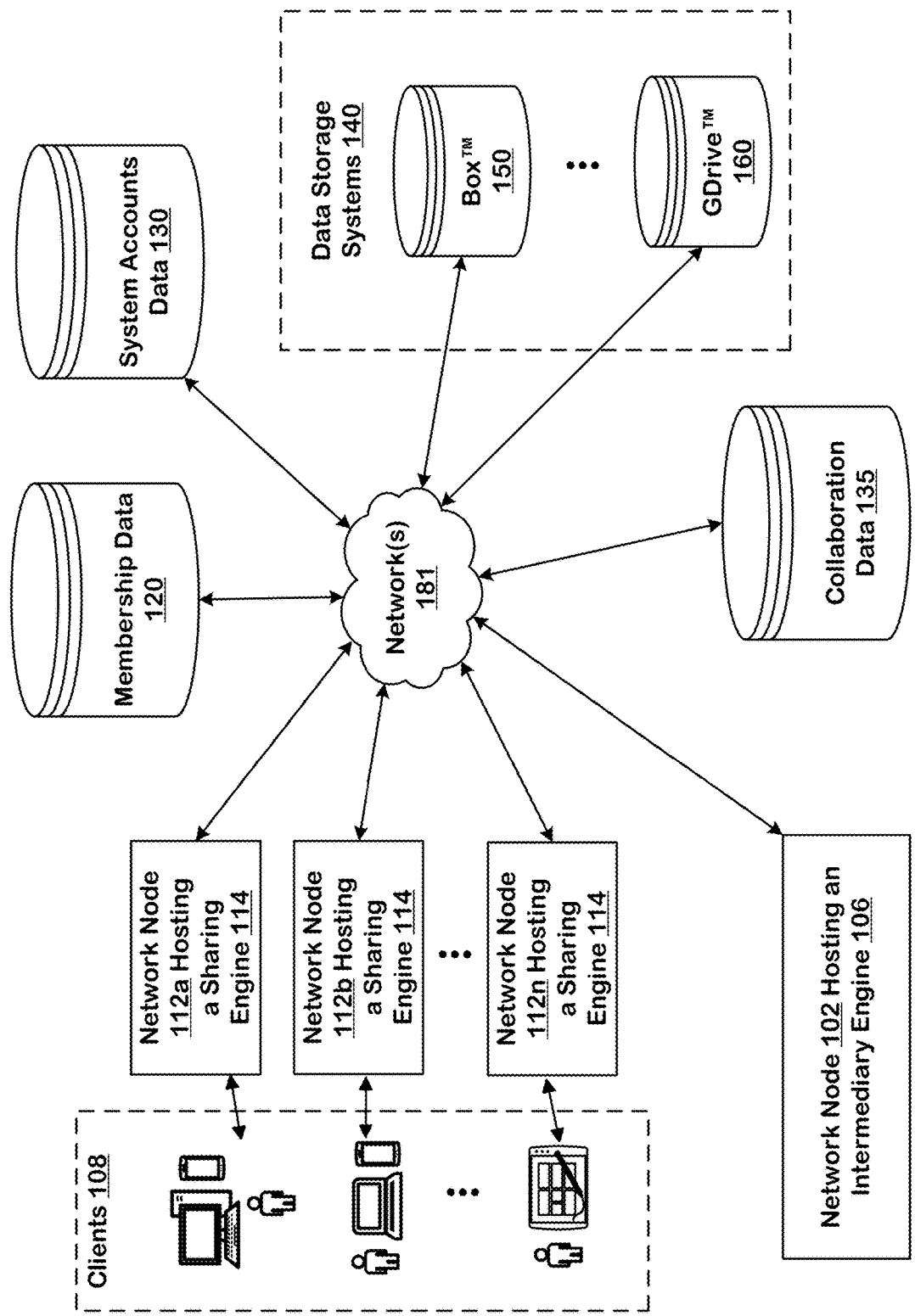
FIGS. 1A and 1B illustrate an architectural level schematic of a system in which an intermediary engine can be used to share and sync data among multiple users with accounts on different storage systems.

The discussion of FIG. 1A is organized as follows. First, the elements of the system are described, followed by their interconnections. Then, the use of the elements in the system is described in greater detail.

FIG. 1A provides a block diagram level illustration of a system 100. The system 100 includes a network node 102 hosting an intermediary engine 106, clients 108, client-side network nodes 112a to 112n hosting a sharing engine 114, a membership database 120, a system accounts database 130, a collaboration database 135, storage systems 140, and a communication network or networks 181. The storage system can include a variety of file storage systems such as cloud-based storage systems, e.g., Box™ storage system 150, Google Drive™ (GDrive™) storage system 160, etc. The system 100 can also include databases to store other supporting data such as file identifiers, application identifiers, authorization data for accessing storage systems and applications, etc.

As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein.

As used herein, a network node is an addressable hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system. More than one virtual device configured as a network node can be implemented using a single physical device.

For the sake of clarity, only three network nodes hosting the sharing engine are shown in the system 100. However, any number of network nodes hosting sharing engines can be connected to the intermediary engine 106 through the network(s) 181. Also, the sharing engine, the intermediary engine, and other processing engines described herein can execute using more than one network node in a distributed architecture.

The interconnection of the elements of system 100 will now be described. Network(s) 181 couples the network nodes 112a, 112b, and 112n, respectively, hosting sharing engine 114, the network node 102 hosting the intermediary engine 106, the membership database 120, the system accounts database 130, the collaboration database 135, the storage systems 140. Clients 108 are connected to the intermediary engine 106 through network nodes hosting sharing engine 114. The users of the system can use a variety of computing devices such as desktop computers, laptop computers, portable or handheld computing devices, mobile phones, etc. to share digital content such as documents, emails, videos, images, etc. organized in files, folders, conversations, other types of system resource with other users for collaboration.

The technology disclosed addresses the difficulty of collaboration between one or more users through sharing and syncing data across multiple storage systems. There are many types of systems that can store different types of data, on-premise or in the cloud, and this data often needs to be collaborated on by multiple system accounts. When it is not possible for every system account to be on the same system due to personal preferences or enterprise policies, collaboration becomes challenging. This often leads to non-compliant sharing of data, such as over email where multiple users are potentially replying with their edits at the same time and from branching email threads. This eventually makes it impossible to track the latest version of data, and whether any of these emails are later forwarded negligently.

The technology disclosed presents a system that enables sharing and syncing of data, such as a file, folder, conversation, image, video, or any other system resource, for collaboration between one or more users across systems, which are implemented using a network of remote servers hosted on the Internet to store, manage, and process data. In some embodiments, the system or components thereof can be implemented using cloud computing comprising applications and other services on a network of remote servers hosted on the Internet to store, manage, and process data. In some embodiments, the system or components thereof can be implemented using local servers, personal computers or mobile computers.

The users can connect to the system using respective client computing devices 108 to share system resources (also referred to as shared system resources or simply resources) with other users. A resource can be a digital content stored in a storage system 140. Consider a user A wants to share a file stored in his Box™ cloud-based storage account 150 with a user B to collaborate. Now further consider that user B does not have an account on Box™ cloud-based storage account. However, user B has a cloud-based storage account on Google Dive™ (GDrive™) 160. Different cloud-based storage system can have different file management systems and file identifiers that can uniquely identify resources in their respective file systems. The file identifier of a shared resource in one storage system may not uniquely identify a copy of the shared resource store in another storage system. The sharing of a file can require making a copy of the master file (such as stored in Box™ account of user A in this instance) and storing the file copy in GDrive™ account of user B. The system provides a user interface to user A from where the user can select the resource for sharing and one or more users with whom user A wants to share the resource.

The technology disclosed addresses the problem of sharing of files and other types of resources across multiple cloud-based system by generating globally unique identifiers for the shared resources. Therefore, the technology disclosed can uniquely identify copies of shared resource in different storage systems. The intermediary engine 106 (also referred to as intermediary system) can use a globally unique identifier for the shared resource to track changes to copies of shared resource in different storage systems as members collaborate and make changes to their respective copies of the shared resource. The system includes logic to receive notifications of changes to copies of shared resource. When a member performs a transaction with a copy of the shared resource stored in a storage system, the system can receive a notification of the transaction. The system can include logic to detect whether content of the shared resource is changed when a notification is received. In one embodiment, the system can calculate content hash of the updated copy and compare it with content hash of a most recent version of the shared resource. If the system detects updates to the copy of the shared resource for which it received the notification, the intermediary engine can initiate a sync process. The intermediary engine can increment a version number of the updated copy to indicate that this version is the master copy or reference version for the shared resource. The sync logic can update other copies of the shared resource for members in the membership with master copy. Therefore, the technology disclosed addresses the problem of sharing and syncing data across different storage systems.

The technology disclosed maintains a membership database that includes a plurality of members. Additionally, the technology disclosed can also include a system accounts database which can store authorization data to access users' storage accounts on various storage systems. A user can have accounts in multiple storage systems and can also have multiple accounts on one storage system. When user A sends a request to share the file with user B, the intermediary engine 106 can receive the invitation request from user A and process it to send the request to user B. The intermediary engine can generate an authorization uniform resource locator (or URL) for user B upon receiving the sharing request from user A. The authorization URL can include information about the sender (user A), the shared resource such as a name of the file or the folder.

The intermediary engine 106 can also include logic to determine whether the storage account information for invited user B or user A that sent the invitation are stored in the system accounts database. The intermediary engine can request the system account information from users when the invitation request is sent to a recipient. The intermediary engine can also separately request the system account information from the sender and the receiver of the sharing request before setting up the membership. The system account record is a unique account on a storage system 140 (such as Box™ GDrive™, Dropbox™, etc.) which stores the shared system resource. The shared system resource can be shared with system accounts across multiple cloud-based systems.

The intermediary engine 106 can add members to a membership database. A member in the membership can collaborate on one or more shared resources associated with the membership. The collaboration level or access privileges of each member can be defined using policies. A policy can be defined for one member, a group of members or a membership. The intermediary engine can store collaboration-wide policies for a membership in the collaboration database 135. A collaboration gives one or more memberships permission to sync a shared resource. The collaboration can be stored as a collaboration record. For example, the collaboration record corresponding to a membership can include access policies for members, groups of members, shared resources, or system accounts of members. The policies can indicate access privileges such as read only access, read and write access, etc.

The technology disclosed uniquely identifies a member in the membership using a membership identifier. The system includes a sync identifier which is common for all copies of the shared resource for all members in the membership. The system can generate a globally unique identifier for each copy of the shared resource in the collaboration by using a combination of the membership identifier of respective member and sync identifier for the shared resource. In one embodiment, the unique identifier for the shared resource is generated by taking a hash of the membership identifier and the sync identifier. The resulting identifier is referred to as a file identifier which can uniquely identify a copy of shared resource in a collaboration. Therefore, the technology disclosed can identify copies of shared resources across multiple storage systems.

Tracking changes in content of copies of shared resource of members and then syncing the copies of other members is a challenge as different storage system do not automatically sync changes to copies of shared resource stored in other storage systems. The technology disclosed includes logic to receive notifications of any changes to copies of files stored in storage accounts of members of a membership. The system account linked to a member of the membership contain contains authorization data that can be used to call application programming interfaces (APIs) of storage systems linked to the member and receive notifications when changes are made to the copy of the file. The technology disclosed can also use other techniques to detect any changes to content of a copy such as polling the storage systems, etc.

When a notification of a change to a copy of the file is received, the intermediary engine can download the copy from the account of the member in the storage system and calculate a content hash. The content hash of the downloaded copy is compared to the content hash of a reference copy or master copy of the shared resource which is the most recent version of the shared resource known to the system. If content hash of the downloaded copy indicates that the content of the downloaded copy has been updated, the intermediary engine can increment a version number of the downloaded copy and designate the downloaded copy as a reference copy or a master copy of the shared resource. The system can then user the master copy for syncing the changes in content to copies of other members in the membership. The technology disclosed can automatically detect changes in content of copies of shared resources stored in different storage systems and sync the changes to other copies of the shared resource.

Figure 1B:
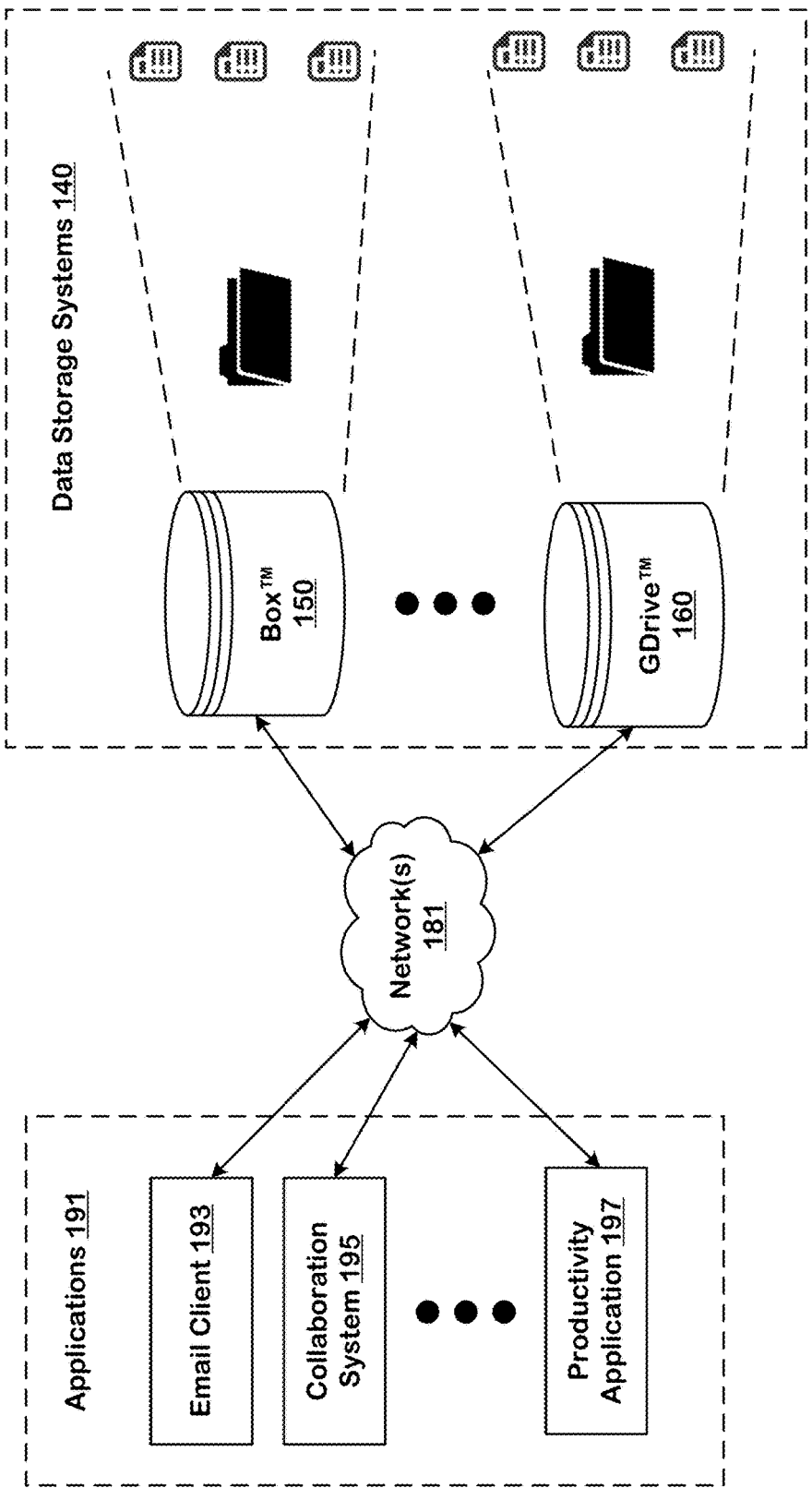

FIG. 1B presents additional components of the system 100 connected via the network 181. Storage systems have separate file systems which may not be compatible with file systems of other storage systems. The files stored in the storage can be registered with applications 191 such as email client 193, collaboration system 195, productivity application 197, etc. A user can read, write or perform other operations on data in the files using the applications. The technology disclosed can store applications related data such as the file types, authorization tokens, etc. for each application. The system can use the authorization data to authorize an application registered with the system to call APIs of the system on behalf of the system account. An application registered with the system can create account records on behalf of their users and is stored as application record in the system. The system can be associated with one or more applications such as productivity software, email clients, collaboration systems, etc. In some embodiments, the user of an application can be stored as a user record in the system and can be linked to multiple account records.

The actual communication path to the network node 102 hosting the intermediary engine 106 through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™.

Intermediary Engine System Components

Figure 2:
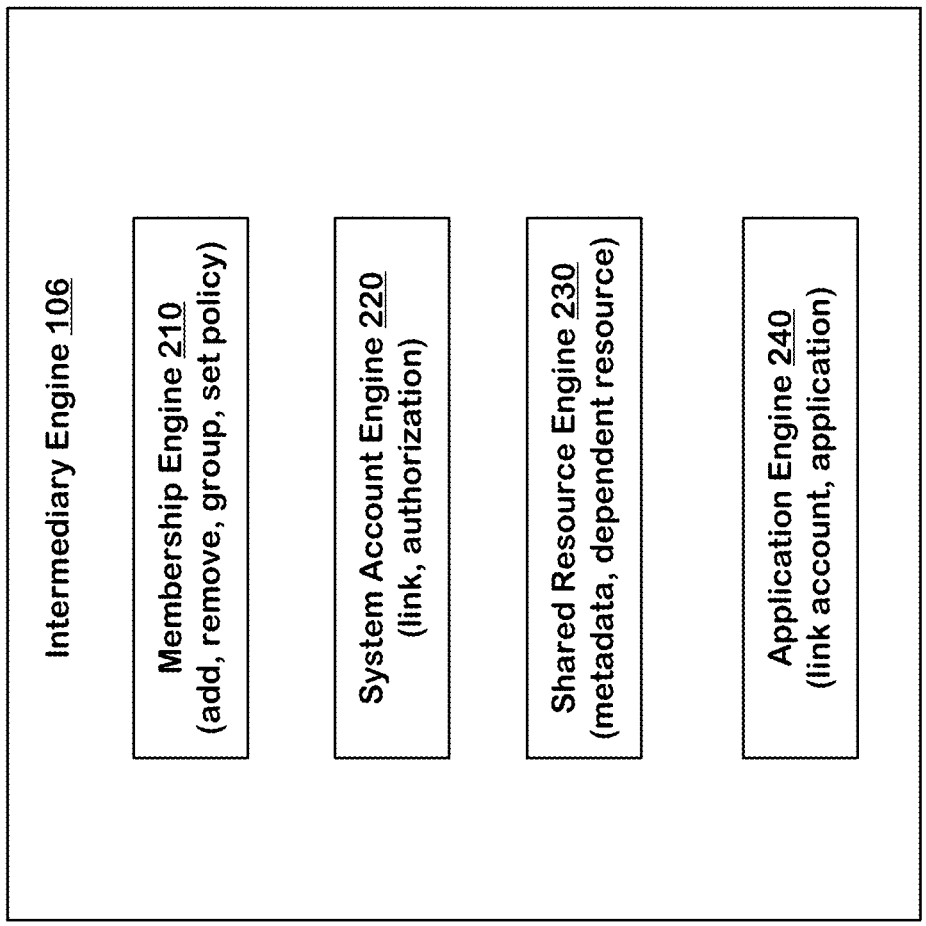
FIG. 2 presents high-level components of the intermediary engine of FIG. 1A.

FIG. 2 is a high-level block diagram of components of intermediary engine 106. These components are computer implemented using a variety of different computer systems as presented below in description of FIG. 9. The illustrated components can be merged or further separated, when implemented. The intermediary engine 106 can comprise of a membership engine 210, system account engine 220, shared resource engine 230, and application engine 240. The methods, protocols and tools provided by the technology disclosed operate on data stored in data structures such as accounts, applications, clouds, collaborations, files, locks, memberships, triggers, users, indexes, and tokens. In one embodiment, the data is stored and indexed in encrypted form. We now present descriptions of the components of the intermediary engine.

Membership Engine

The membership engine 210 includes logic to add members to the membership database, and remove members from the membership database. It can also include logic to set access policies for members and groups of members in the membership.

The membership engine includes logic to receive a membership invite from a member in the plurality of members for a user to join a membership. The user can have an account in the system containing the authorization information for the user's account in a storage system, enabling the system to perform proxy services on behalf of the user. Otherwise, the system can get this information from the user before linking the storage account of the user with a system account. The membership can include multiple members to collaborate on a shared resource. The membership engine includes logic to send the membership invite to user. The user can accept the membership invite from the member upon which the membership engine receives an accept membership message from the user. The membership engine can then add the user in the membership database as a new member and download a copy of shared resource to the cloud-based storage account linked to the new member.

The technology disclosed allows a policy to be set for an individual membership, cloud, or user record, as well as for a group of membership, cloud, and/or user records. The policy can be stored in the individual record, a group-type record, such as a collaboration record, that is linked to a group of records, or a policy record that is linked to the individual or group-type record. For example, a membership with the "viewer" policy can sync down changes made to the shared system resource by others, while a membership with the "editor" policy can also sync up their own changes made to the shared system resource.

The technology disclosed provides a "collaboration API" which implements methods to add members in the membership database, update members in the membership database, remove members from the membership database, update members in the membership database, list member in the membership database, get members associated with a membership identifier or an invite token. The collaborations API also provides methods for sharing and unsharing of resources in a collaboration. We present a brief description of the collaborations API methods below:

Collaborations API

/Collaboration/Share

The share method includes logic to create a collaboration record in the system. This method also includes logic to create a membership record in the system for a user sharing a system resource, and can create membership records in the system for each invited user. In one implementation, the system resource to be shared is first created on a system account of the user. In other implementations, the system resource can be created or added to the collaboration after members are added to the membership.

The method includes logic to send an invite message for each invited user comprising one or more invite URLs (universal resource locators) to an address of the invited user, such as an email address, phone number, username, group name, account name, or any identifier of an invited system account on an invited system in which a message can be sent to. An invite URL can comprise of an invite token of the invited user. The invite URL can initiate an authorization URL.

/Collaborations/Unshare

The unshare method can revoke the collaboration associated with a collaboration identifier (collaboration id). In one instance, the system can revoke the collaboration by invalidating each associated membership. The system can also delete the shared resource or system resource associated with each of the one or more memberships in the collaboration.

/Collaborations/Remove_Membership

The remove_membership method can revoke each membership associated with a specified membership identifier (membership id). The system can delete the shared resource or system resource associated with each of the one or more revoked memberships.

/Collaborations/Update_Membership

The update_membership method updates a membership associated with a membership identifier. In one instance, additional parameters can be sent with the API call to set or reset the existing parameters of the membership.

/Collaborations/Add_Membership

The add_membership method can create a membership record in the system for an invited user. The system can send an invite message comprising one or more invite URLs to an address of the invited user, such as an email address, phone number, username, group name, account name, or any identifier of an invited system account on an invited system. An invite URL can comprise of an invite token of the invited user. The invite URL can initiate an authorization URL.

/Collaborations/Transfer_Ownership

The transfer_ownership method can transfer ownership of the collaboration associated with a collaboration identifier to the membership associated with a membership identifier.

/Collaborations/Update_Policies

The update policies method can update the collaboration associated with a collaboration identifier including updating the policy associated with the collaboration.

/Collaborations/List_Memberships

The list_memberships method can get the memberships associated with a collaboration identifier, or the cloud record associated with an account identifier.

/Collaborations/Get_Membership

The get_membership method can query the membership associated using a membership identifier from the membership database. It can also query the membership database using the invite token.

The technology disclosed include logic to detect when a shared file is out of sync with the master file in the membership. For example, "updateFiles" method in the "Cloud Task Manager" API is presented below which partially implements the sync logic. We present an overview of the updateFiles method below.

Cloud Task Manager API

/Cloud_Task_Manager/updateFiles

The updateFiles method includes logic to determine whether there are files in a system account that are out of sync with the system (i.e., the master copy). If so, the method launches tasks that incrementally bring the system account in sync with the system. In some embodiments, the system only calls the updateFiles method of the Cloud Task Manager API if the system account has no new changes. In some embodiments, the next task for a file involves calling one or more methods in the File Task Manager, Membership Task Manager, or Sync Task Manager APIs. We present the methods in these APIs in particular implementations section.

The system can set a schedule id attribute on the file record as well as on the task payload for each file record for which a task is launched. When the system performs the task, the system can determine whether the task is still valid by checking that the schedule identifier of the file record associated with the task matches the schedule identifier of the task payload. In some embodiments, the system can prepare any expired task to be restarted by unsetting the schedule id attribute on the file record associated with the expired task.

In some embodiments, the system can determine whether there are any paused files that were previously paused from syncing to the system account, such as due to an isStorageLimitExceeded or isFileSizeLimitExceeded error, and then resume syncing any paused files that should now sync without issue.

Sync Task Manager API

The system implements part of the sync functionality in methods of "sync task manager" API. The sync task manager implements methods to sync copies of shared resources in a membership and includes part of the functionality to implement fanout for incrementally updating copies of shared resource. We present an overview of methods in the sync task manager API.

sync_task_manager/startTask

The startTask method determines one or more next tasks needed to keep a file of a system account synced with a collaboration, and then performs one or more of the next tasks. The next tasks can include calling syncUnauthorizedItem, normalizeItem, syncItem, fanoutItem, syncContents, and/or cleanupItem from the Sync Task Manager API. In some embodiments, the system can limit the number of tasks to perform for any given call to the startTask method based on the number of calls that will need to be made to the Cloud API for a given system account. In some embodiments, the system can call the startSync method of the Sync Task Manager API, which can then call the other methods of the Sync Task Manager API.

sync_task_manager/startSync

The startSync method determines one or more next tasks needed to keep a file of a system account synced with a collaboration, and then performs one or more of the next tasks. The next tasks can include calling syncUnauthorizedItem, normalizeItem, syncItem, fanoutItem, syncContents, and/or cleanupItem from the Sync Task Manager API. In some embodiments, the system can limit the number of tasks to perform for any given call to the startTask method based on the number of calls that would need to be made to the Cloud API for a given system account.

sync_task_manager/syncUnauthorizedItem

The syncUnauthorizedItem method handles a new file that is added to a shared folder by a membership that does not have sufficient permission for this action. In some embodiments, the system can relocate the new file to a folder on the associated system account that is outside the shared folder.

sync_task_manager/normalizeItem

The normalizeItem handles a file that needs to sync to a collaboration, whose name is incompatible with a first-party or third-party system that is supported by the system. In some embodiments, the system can first determine a compatible name by calling the getNormalizedFileName method of the File Database Object API, and then rename the file by calling the moveItem method of the Cloud API.

sync_task_manager/syncItem

The syncItem method handles a file on a system account that needs to sync a modification, move, rename, and/or delete operation to a reference file record. The reference file record is the master copy (or reference copy) of the shared resource. The reference file record is created when the file is first synced with a collaboration. The reference file record is deleted when the file is deleted from the collaboration. The reference file record serves as a source of truth for the file in the collaboration.

A (non-reference) file can sync a modification to the reference file record if they share the same synced version, which results in generating a new value for the synced version that is set on both the file record and the reference file record, as well as the file becoming the new source file. In some embodiments, the file can sync a move to the reference file record if they share the same synced parent file identifier. The synced parent file id is the id of the reference file record that is associated with the parent of the reference file record. In some embodiments, the file can sync a rename to the reference file record if they share the same synced file name. In some embodiments, the file can sync a move and/or rename to the reference file record if they share both the same synced parent file id and synced file name.

In some embodiments, successfully syncing to the reference file record results in creating or updating a fanoutItem task on the source file record that syncs the update to the rest of the collaboration. In some embodiments, failing to sync to the reference file record results in creating or updating a fanoutItem task on the source file record that reverts the update on the file.

Sync_Task_Manager/fanoutItem

The fanoutitem method handles a file that needs to sync a reference file record to one or more memberships in a collaboration. In some embodiments, if the file becomes unable to sync the reference file record, such as when access is revoked to a system account associated with the file, the system can transfer the fanoutItem task of the file to an associated source file. In some embodiments, if a membership is temporarily unable to sync from the reference file record due to a limitation of a system account associated with the membership, such as limited storage space or a max supported file size, the system can pause the membership from syncing the reference file record until the limitation is resolved.

In some embodiments, syncing the reference file record to a membership includes creating or updating a synced file associated with both the membership and the reference file record, with the latest data downloaded from a source file associated with the reference file record. The latest data can be downloaded from an updated synced file associated with the reference file record. Syncing the reference file record to a membership includes first creating a conflicted copy of a synced file associated with both the membership and the reference file record, before updating the synced file.

Syncing the reference file record to a membership can include moving a synced file associated with both the membership and the reference file record, to a parent folder where the synced file identifier of the parent folder file record is equal to the synced parent file identifier of the reference file record.

Syncing the reference file record to a membership can include renaming a synced file associated with both the membership and the reference file record, to the synced file name of the reference file record.

Syncing the reference file record to a membership, when the reference file record is marked for deletion or doesn't exist, includes deleting a synced file associated with both the membership and the reference file record. Syncing the reference file record to a membership, when the reference file record is marked for deletion or doesn't exist, but the synced file associated with both the membership and the reference file record has been updated since being synced with the latest data, includes renaming the synced file and disassociating it from the reference file record so that it can be associated with a new reference file record that is separately synced to the collaboration.

The system can cache a response of a call to the Cloud API, so if the system needs to restart a database transaction due to a serialization error, or any other error, the system can use a cached response instead of making a new call to the Cloud API. In some embodiments, the system can cache the response in a key-value data structure whose key is derived from one or more values of a record associated with the call to the Cloud API, such as a file record. This prevents the system from using an outdated cached response in the scenario where the record changed sometime between a first transaction attempt and a subsequent transaction attempt.

The system can sync a reference file record one from a fanoutItem task one and a reference file record two from a fanoutItem task two, to a membership where the reference file record one has the same synced parent file identifier and synced file name as a synced file two that is associated with both the reference file record two and the membership. In this scenario, a synced file one associated with both the reference file record one and the membership may not be able to sync in the fanoutItem task one until synced file two syncs in the fanoutItem task two, since synced file two is initially located at the same file path as where reference file record one in fanoutItem task one is trying to move synced file one. As a result, the system can temporarily sync the synced file one with a non-conflicting file name, and then when the reference file record two of fanoutItem task two eventually finishes syncing to the membership, the system can retry syncing the reference file record one to the membership. If the system fails on the retry, the system can then try to sync the non-conflicting file name to the reference file record one.

Sync_Task_Manager/syncContents

Handles a folder that needs to sync its contents to one or more memberships in a collaboration, as well as a folder of a system account whose membership is revoked and needs to stop syncing with the collaboration. The system can batch resync the source files associated with the contents of the folder. Resyncing a source file is the process of determining a next best alternative source file, and then if alternative source file is found, transferring the role and metadata associated with being the source file from an existing source file record to an alternative source file record.

Sync_Task_Manager/cleanupItem

The cleanupItem method handles a file that has no more tasks to perform from the Sync Task Manager API. For each membership in which the file has stopped syncing, the system can unset all membership metadata from the file. In some embodiments, for each membership in which the file is still syncing, the system can unset all sync metadata from the file that is used to inform the system that there are additional tasks to perform from the Sync Task Manager API.

System Account Engine

The account engine 220 includes logic to link accounts in storage systems for members in the membership to receive notifications for transactions with respective copies of the shared system resource. The system account engine can include logic to access storage accounts to download copies of shared resource or upload copies of shared resources. The technology disclosed implements methods that allow the system to efficiently sync a shared system resource.

The system account engine can perform the syncing when it is not possible for every system account to be on the same storage system, and/or when one or more system accounts is on a third-party system. For example, the system may need to sync an updated shared system resource from system account one to everyone else in a collaboration. Although this operation can be naively parallelized by updating multiple sets of system accounts at once, doing so may result in what looks like a DDoS (distributed denial of service) attack to system account one. Instead, the system syncs an initial random set of system accounts with the updated data on system account one, and then the remaining system accounts are synced with the updated data on subsequent system accounts as they become updated. Moreover, access to a system account may be revoked in the middle of syncing to other system accounts in the collaboration, in which case the system is designed to always know the next best system account to sync from for any given shared or dependent system resource.

The technology disclosed includes an "account" API which implements methods to authorize access to a system account. We present a brief description of method of the account API below.

Accounts API

/Accounts/Authorize

The authorize method generates an authorization URL which is sent to a user of an application registered with the system through an authorization flow. The process ends with the user being redirected back to the system, along with authorization data that allows accessing a system account of a first-party or third-party system. The authorization URL includes a cloud client identifier, which identifies an application registered with a system. The cloud client identifier is associated with the application registered with the system. The technology disclosed associates shared resources with applications so that user can access the shared resources using the correct application for collaboration tasks.

The user is redirected back to the system based on a redirect URI (universal resource identifier) that is included in the authorization URL. In some embodiments, additional data is cached on the system that can be later retrieved by a redirect token included in the redirect URI. The redirect token circumvents limitations of passing data through the redirect URI. A system client identifier can be cached or passed through the redirect URI, which identifies the application registered with the system.

In some embodiments, an invite token is cached or passed through the redirect URI, which is associated with a pending membership to a collaboration. The invite token permits the user to accept the pending membership and associate it with the system account being authorized.

/Accounts/Redirect

The redirect method can be called by the system after the user completes the authorization flow. In some embodiments, the system either receives authorization data, or the system receives an authorization code that must be exchanged for authorization data by calling the updateToken method of the Cloud API provided by the system. The method can create or update a unique cloud record in the system that stores the authorization data returned by the authorization flow. In some embodiments, authorization data is stored for each application registered with the system that successfully completes the authorization flow for the same system account.

The method can create a new account record in the system. The account record includes an account token that authorizes an application registered with the system to call the public APIs on behalf of the system account.

In some embodiments, when an invite token is cached or included in the redirect URI, and the system accepts the membership associated with the invite token, and begins syncing the shared system resource associated with the membership to the system account.

The redirect method completes the process by redirecting the user to an application redirect URI that is associated with the application registered with the system. In some embodiments, the application redirect URI includes the account token. In some embodiments, the application redirect URI includes an account code that can be exchanged for the account token.

/Accounts/Token

The token method includes the logic to exchange an account code or account token for a new account token. The system can store the previous account token so that it can remain valid for a period of time.

/Accounts/Validate

The validate method include the logic to validate the authenticity of an account code or account token.

/Accounts/Revoke

The revokes method can revoke the account associated with an account token or account identifier. The system can revoke the account by invalidating the account token. The system can also revoke all accounts associated with the same application and system account as the account provided as an input parameter. The system invalidates the authorization data associated with the application that is stored in the cloud record associated with the system account. The result is that all accounts associated with the same application and system account as the account are effectively revoked.

/Accounts/List

The list method can query and retrieve accounts associated with an application registered with the system. Accounts can be filtered by system account and/or account status.

/Accounts/Get

The get method can query and retrieve the account associated with an account token or account id. In some embodiments, the system can include authorization data of the system account associated with the account. In some embodiments, the system can include the specific authorization data associated with the application registered with the system that created the account.

Shared Resource Engine

The shared resource engine 230 includes logic to set metadata for copies of shared resources. The metadata is used to access copies of shared resources for members in a membership for syncing the copies to master copy. The system includes a file API which implements methods to copy, move, delete (file and folder), create, upload, download, list and get methods.

Files API

/Files/Copy

The copy method calls the copyItem method of the Cloud API, which copies a file on a system account associated with an account id or account token, to a parent folder on the system account. Optionally, it can also set the file name. In some embodiments, the system can auto-rename the file when another file with the same name already exists in the parent folder.

/Files/Move

The move method calls the moveItem method of the Cloud API, which moves a file on a system account associated with an account id or account token, to a parent folder on the system account. It can optionally update the file name. In some embodiments, the system can auto-rename the file when another file with the same name already exists in the parent folder.

/Files/Delete

The delete method calls the deleteItem method of the Cloud API, which deletes a file on a system account associated with an account id or account token.

/Files/Create_Folder

The create folder method calls the createFolder method of the Cloud API, which creates a folder in a parent folder on a system account associated with an account identifier or account token. In some embodiments, the system can auto-rename the folder when another file with the same name already exists in the parent folder.

/Files/Upload_Part

The upload_part method calls the uploadFilePart method of the Cloud API, which continues and/or completes an upload session on a system account associated with an account id or account token. In some embodiments, the system can auto-rename the file when another file with the same name already exists in the parent folder.

/Files/Upload Start

The upload start method can call the uploadFileStart method of the Cloud API, which starts an upload session on a system account associated with an account identifier or account token, to a parent folder on the system account. In some embodiments, the system can auto-rename the file when another file with the same name already exists in the parent folder.

/Files/Upload

The upload method calls the uploadFile method of the Cloud API, which uploads a file to a parent folder on a system account associated with an account identifier or account token. In some embodiments, the system can auto-rename the file when another file with the same name already exists in the parent folder.

/Files/Download

The download method calls the downloadFile method of the Cloud API, which downloads the contents of a file on a system account associated with an account identifier or account token. In some embodiments, the system can constrain the download to a specific byte range.

/Files/List

The list method calls the loadContents method of the Cloud API, which gets the metadata of the contents of a folder on a system account associated with an account id or account token.

/Files/Get

The get method can call the loadMetadata method of the Cloud API, which gets the metadata of a file on a system account associated with an account id or account token.

Application Engine

The application engine 240 includes logic to link applications to system accounts of members. The applications are registered with the system as application records. Users of the system can access files using applications and perform file operations such as read, write, etc. The application engine implements methods that are accessible to the system, as well as third-party systems, via application programming interfaces (APIs). The technology disclosed includes methods to connect to APIs provided by third-party systems. The system includes and "applications" that implements method to manage applications registered with the system.

Applications API

/Applications/Delete

The delete method revokes the application associated with an application identifier. The system can revoke the application by invalidating the application secret. The result is that all accounts associated with the application are effectively revoked.

/Applications/Reset Key

The reset key method replaces the application secret associated with an application identifier. In some embodiments, the system can store the previous application secret so that it can remain valid for a period of time.

/Applications/Update

The update method updates the application record associated with an application identifier.

/Applications/Create

The create method creates a new application record in the system. The application record includes an application secret that authorizes the application to call the public APIs on behalf of the account associated with an account identifier.

/Applications/List

The list method can query and retrieve the applications associated with a user or cloud record. Applications can be filtered by application status.

/Applications/Get

The get method can query and retrieve application associated with an application identifier. The system can include the application secret of the application.

Entity Relationship Diagram for Intermediary Engine

Figure 3:
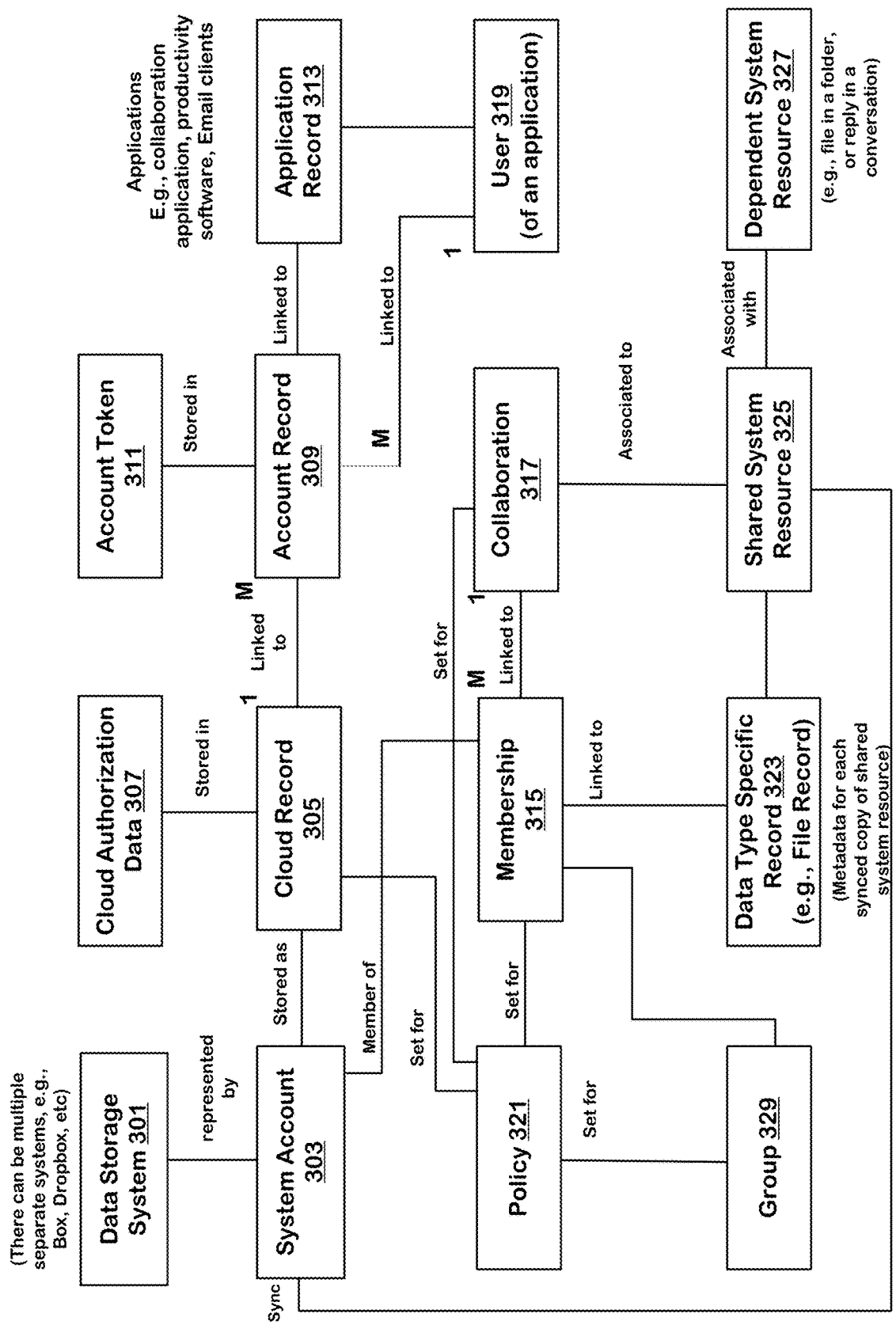
FIG. 3 presents an entity relationship diagram indicating the relationship amongst different entities of the data sharing and syncing system.

FIG. 3 is an entity relationship diagram illustrating various entities and their interconnections. We can map the various entities to system components of intermediary engine presented in FIG. 2. For example, a storage account 301, a system account 303, a cloud record 305 and a cloud authorization data 307 can be used to implement the logic in system account engine 220. A membership entity 315, a policy entity 321, a group entity 329 and a collaboration entity 317 can be used to implement the logic in membership engine 210. A shared system resource entity 325, a data type specific record entity 323, a dependent system resource entity 327 can be used to implement the logic in shared resource engine 230. An application record entity 313, an account record 309 and an account token 311 can be used to implement the logic in application engine 240.

A user of the system can use a variety of applications such as email clients, productivity software application, collaboration applications, etc. to work and collaborate on shared resources. The system can store a plurality of account records for each user which can include account authorization data. The system can access an account record to authorize an application (e.g., productivity software, collaboration software, email clients, etc.) registered with the system to access a copy of the shared resource associated to a member in the membership. The account record can store an account token 311 which can be used to get access to an application via an API on behalf of the user.

A system account record 303 is a unique account in a cloud-based storage system 301. A user can have multiple accounts in a cloud-based storage system. A user can also have accounts across multiple cloud-based systems. In one embodiment, the system account can be stored as a cloud record 305. One cloud record 305 can be linked to multiple account records 309 as files associated to a variety of applications can be stored in a cloud-based storage account. The cloud record can contain authorization data associated with a system account. The cloud authorization data can be used to authorize an application registered with the system to call APIs of the system on behalf of the system account.

The intermediary system includes logic to add members to a membership database for collaboration on a shared resource. The membership 315 represents the membership database. In one embodiment, the system can include membership collaboration APIs to create new members and add members to the membership database. The membership entity 315 can be linked to a collaboration entity 317, a cloud record entity 305 via the system account record, and a data type specific record entity 323.

The collaboration entity can assign access permissions for shared resource for a membership. Instances of collaboration entities can be stored in the collaboration database as collaboration records. A collaboration record can be linked to one or more members in the membership defining access permissions for the members. The system can include a sync identifier for a shared resource shared by members in the membership. Thus, the value of sync identifier is the same for all copies of the shared resource in a membership. A collaboration record can include collaboration-wide policies such read and write, or read only access for a shared resource. The system includes logic to set policies that define access privileges for members of a membership. A policy can be defined by a policy record stored as an instance of a policy entity 321. The policies can also be defined for cloud records. The system also include logic to create groups of members in a membership, groups of users, and groups of cloud records. The system can then define access policies for such groups.

A shared system resource 325 can be a file, folder, an email, a conversation or other types of content. The system includes a data type specific record 323 which can include metadata for synced copies of shared resource 325. The system can also include dependent system resource 327 which can be a file in a folder, a sub folder in a folder, a reply in a conversation of other types of data or content that is related to a parent shared system resource. We now present process steps for sharing and syncing of shared resources amongst members of a membership.

Sync Process for Shared Resource

Figure 4A:
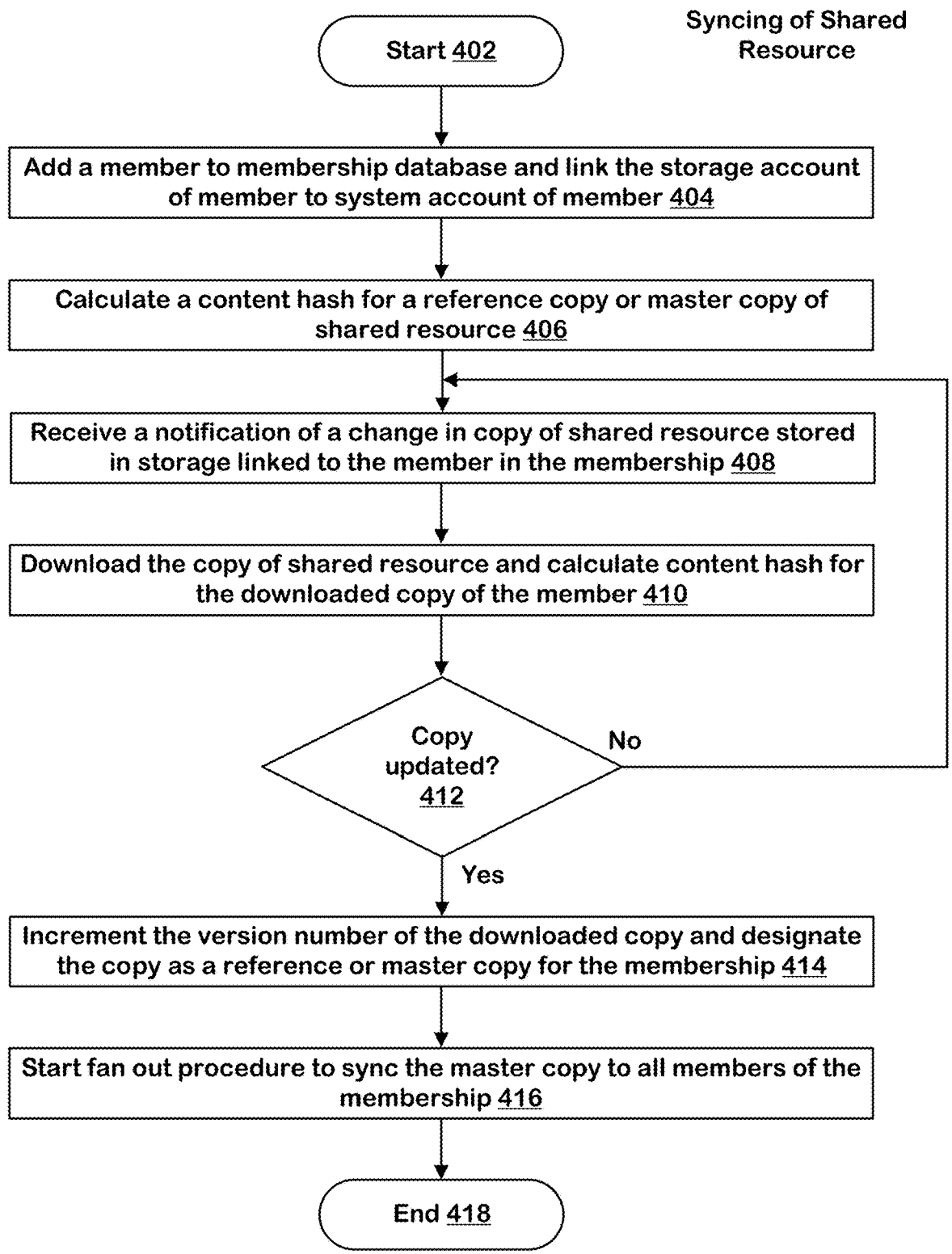
FIG. 4A is process flow diagram illustrating process steps for syncing of shared resources.
Figure 4B:
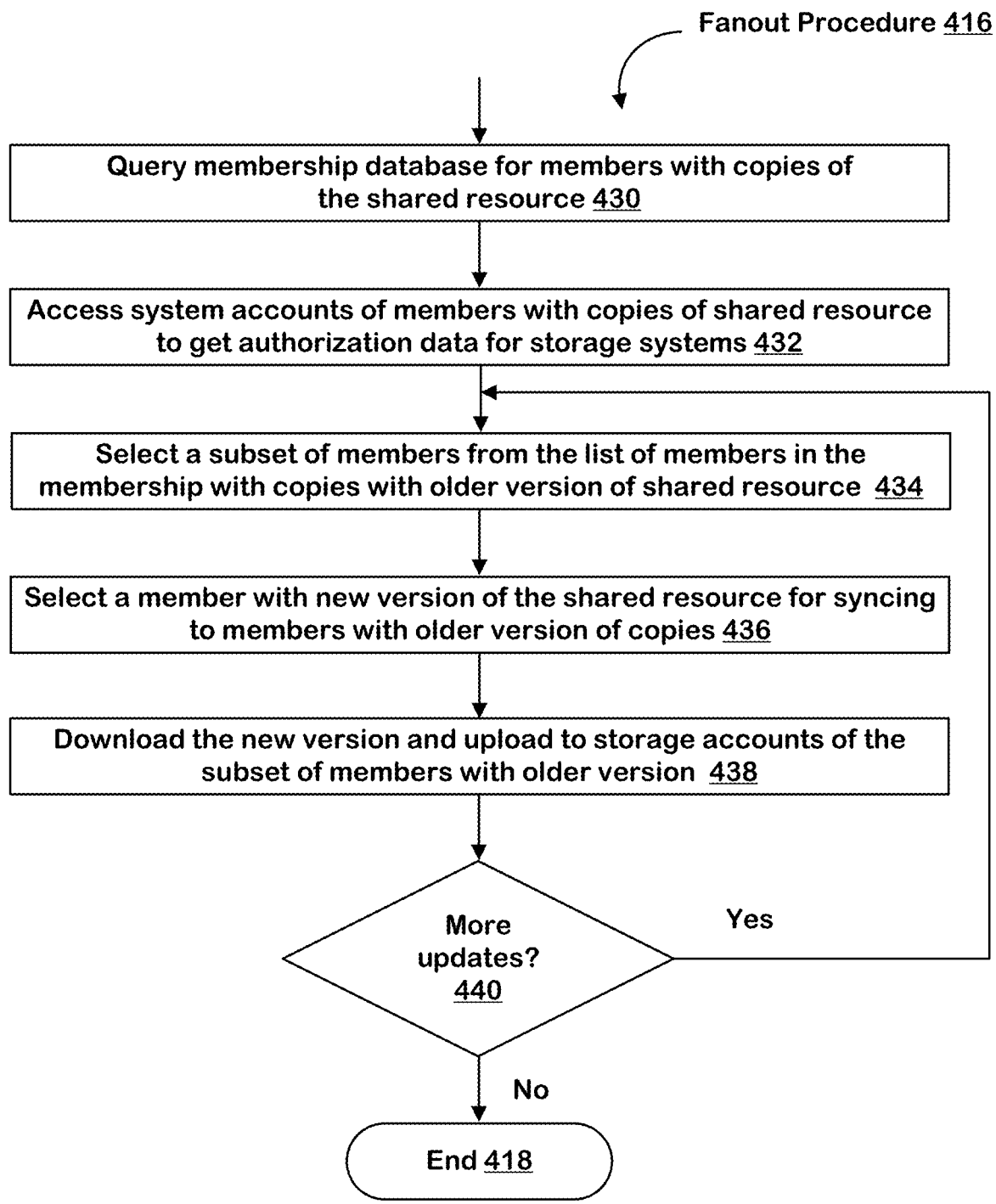
FIG. 4B presents process steps for fanout procedure for syncing copies of shared resources.

FIGS. 4A and 4B present a process for syncing shared resources. The flowcharts illustrate logic executed by the server, clients, or both. The logic can be implemented using processors programmed using computer programs stored in memory accessible to the computer systems and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown The sharing and syncing process starts at a step 402. At a step 404, the intermediary system can add a member to a membership. Adding a member to a membership can include an invitation from an existing member of the membership. The system receives an invite from a member in the plurality of members for a user to join a membership to collaborate on the shared resource. The invitation can be in the form of a uniform resource locator (URL) addressed to a user and sent to the user via an email address or as a text message to cell phone number of the user. The intermediary system can send the membership invite to the user and receive an accept membership message from the user in response to the invitation. Upon receiving this confirmation, the intermediary system can add the user to the membership.

The system includes logic to calculate a content hash for a reference copy or master copy of the shared resource at a step 406. In one embodiment, the system can assign version numbers to copies of the shared resource. The copy with the highest version number is designated a master copy. The system can then initiate a sync process for updating the copy of shared resource for the new member. The system can receive a notification (step 408) for a change in the copy of shared resource stored in storage system of one of the members of the membership. The system can download the copy of shared resource from the storage account of the member from where the change notification is received and calculate a content hash for the downloaded copy (step 410). The system includes the logic to compare the content hash of the downloaded copy with the content hash of the master copy to determine whether the downloaded copy is updated (step 412). If there is no update in the content of the downloaded copy, the process returns to step 408 and waits for a new notification of change. Otherwise, the system starts the sync process to update the copies of other members of the membership in the following steps.

When a new member is added to the membership, the system can start the sync process for the new member without calculation of the content hash and upload the master copy of the shared resource to the storage account of the new member. For subsequent updates, the system can follow the steps 406, 408, and 410.

Steps 414 and 416 present the process steps for syncing the copies all members of the membership with the updated copy of the member identified above. The system increments the version number of the updated copy of the member which indicates that this is the master copy as the copy of the shared resource with the highest version number is considered as the master copy of the shared resource (step 414). At a step 416, the system fanouts the master copy to update copies of shared resource in cloud-based storage accounts for members in the membership. We present further details of the fanout process in the following process flowchart.

FIG. 4B presents detailed process steps for the fanout procedure. At a step 430 the system queries the membership database for members with copies of the shared resource. The system accesses system accounts of members at returned by the query in step 430 to get authorization data for their respective accounts in storage systems (step 432). The system selects a subset of members returned by the query to update the copies of the members in the subset with the master copy. In one embodiment, the system randomly selects the members returned from the database in response to the query at step 430 for including in the subset at step 434. The system can select the members using other criteria. For example, the system can select a subset of members from a starting sequence of members in the returned list of members from the membership database. The system can also select members based on a priority level or ranking assigned to members in the membership. The system can also select members based on storage systems, for example, selecting members with accounts in a particular storage system or selecting members with accounts in different storage systems.

At a step 436, the system selects a source member whose master copy will be used to update the copies of shared resources of other members in the membership. The system can select a single member with a master copy to act a source for updating copies of members in the subset of members selected at the step 434. The system can also select more than one member with master copies (i.e., copies of shared resource with most up to date versions) to act as a source. When the system selects more than one members as a source, the system includes logic to start the fanout process in a parallel manners, i.e., each member selected to act as a source of master copy will update a selected number of members in the subset of members. This parallel fanout process can increase the efficiency of the fanout process by parallel syncs. There are additional benefits of this fanout technique as it can reduce the chances of blocking of access by a storage system by classifying the access to downloaded master copy from an account as a distributed denial of service attack. The parallel fanout can also increase robustness of the sync process as the system can dynamically select an alternate member's copy as a source (master copy) if connection to a member's storage account is disrupted due to network or other issues.

The system downloads master copies of shared resource from one or more members in the membership that are selected to act as a source with master copies for updating the copies of other members in the membership (step 438). The downloaded master copies are then uploaded to the storage accounts of members in the subset. At a step 440, the system checks if there are more members in the membership with old versions of the shared resource. If this is true, the steps 434 to 438 are repeated. Otherwise, the process ends at a step 418.

Client-Side Features of the Sharing Engine

Figure 5:
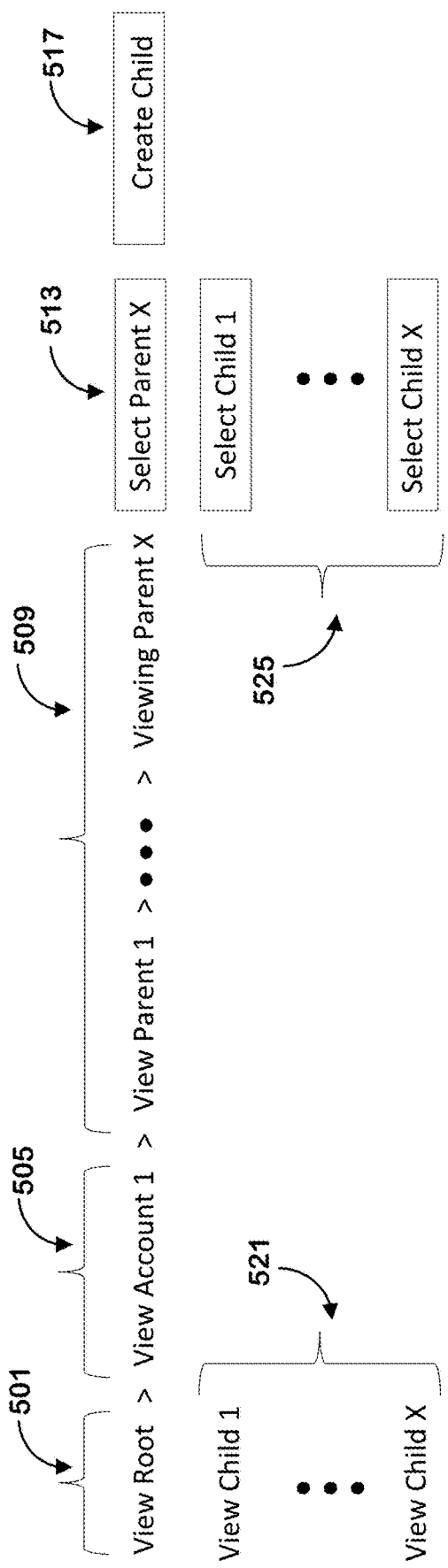
FIG. 5 presents an example user interface for selection of shared resources for collaboration amongst members of a membership.

FIGS. 5 to 8 present user interface elements that initiate the client-side procedures to select shared resources for collaboration, sending invites to users of the system, and accessing storage systems linked to a user. FIG. 5 shows an example user interface for a user of the system in which the user can select a shared resource from an account in a storage system. The user interface shows a file path starting from a root 501, account 1 505, a hierarchy of parents 509. The user interface also shows a list of child resources 521 (or dependent resources) for the shared resource. The buttons 513 and 521 can be used by a user to initiate the procedure for selecting the parent and child resources showed in file paths 509 and 521 respectively for sharing with members of the membership. The user can also use the button 517 to create a new child resource for the shared resource.

Figure 6:
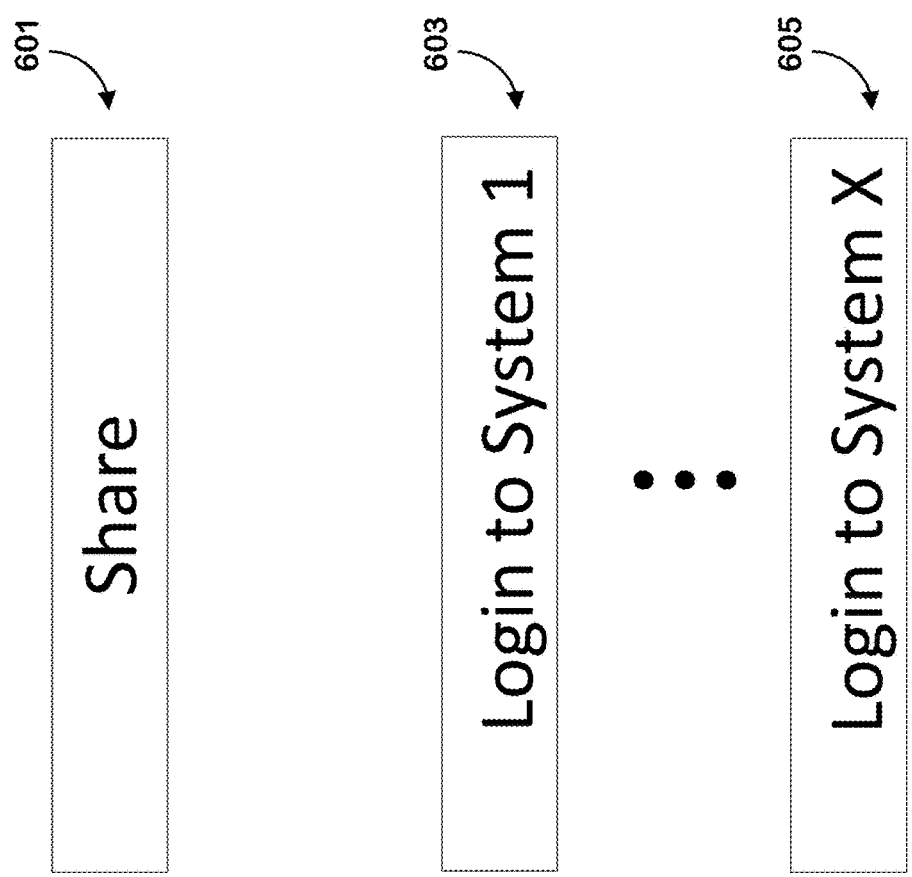
FIG. 6 presents user interface elements for initiating the sharing process and accessing different storage systems.

FIG. 6 shows user interface element such as button 601 for initiating the procedure for sharing the selected resource by a user with other users. The sharing engine also provides logic for users of the system to login to different storage system accounts. The system shows buttons 603 and 605 for login to storage system 1 and storage system X respectively. The user can access her storage account from the system. The system can use the cloud authorization data stored with the system account of the user to provide access to the user to respective storage systems.

Figure 7:
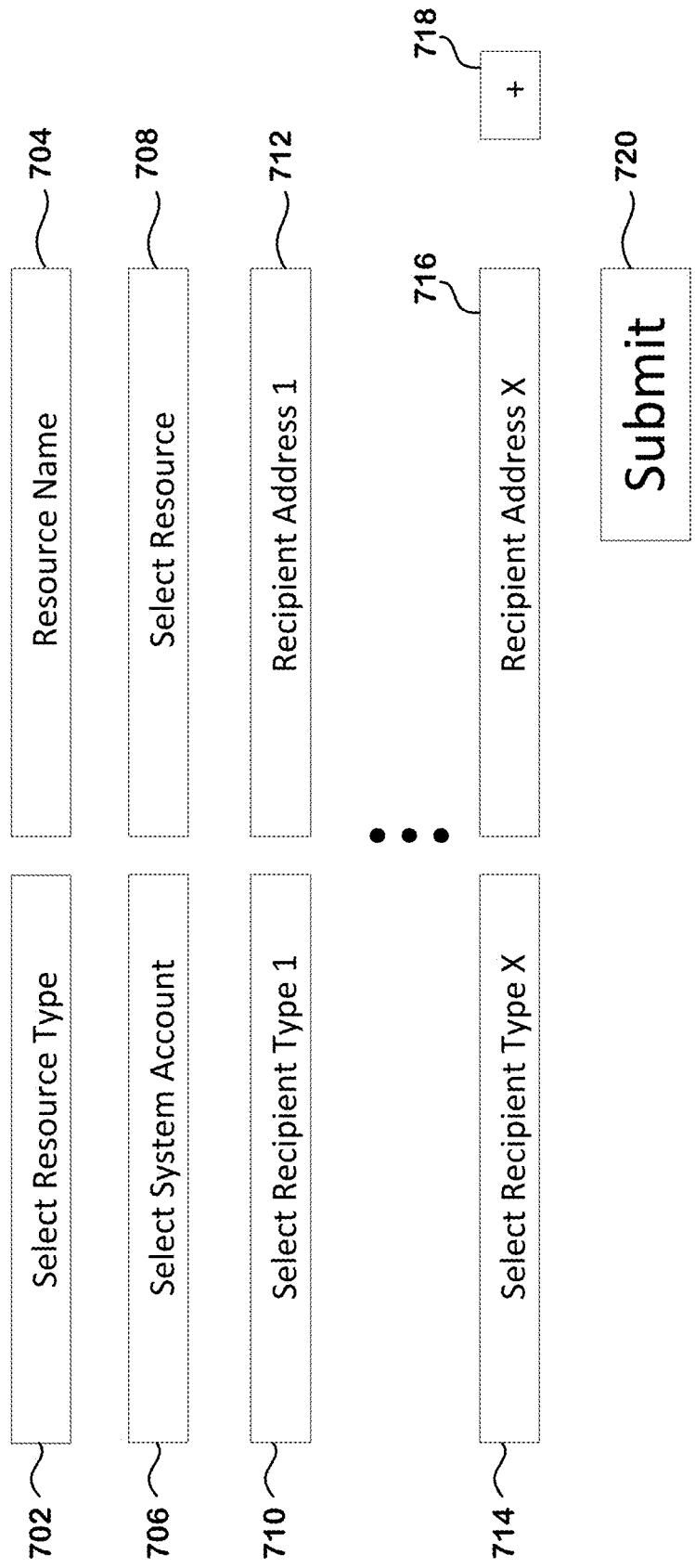
FIG. 7 presents example user interface elements for selection of resources and members.
Figure 8:
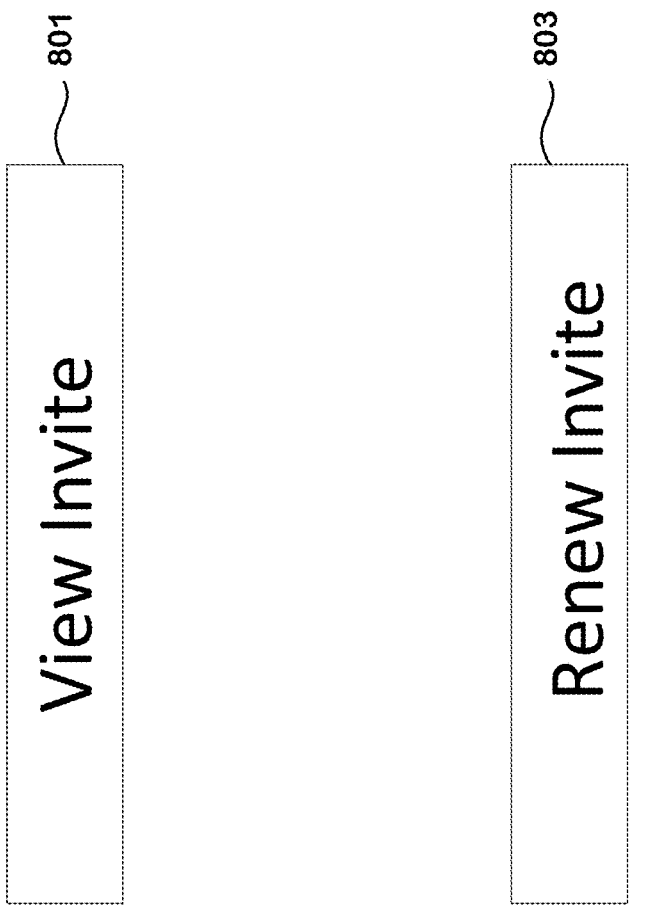
FIG. 8 presents example user interface elements for sending an invite to a user for collaboration on a shared resource.

FIG. 7 presents another user interface which allows the user of the system to select a resource type (702) for sharing with members of a membership. The system can assign a resource name (704) to the selected resource type. A system account (706) can be selected from which a shared resource can selected (708). The system account is linked to a storage system as described above. The user can select the recipients for sharing the resource. User interface elements 710, and 714 can be used to select a type of the recipient. The recipients have respective recipient addresses such as email addresses to receive the invitation message to join the membership. Users can be added by pressing the plus symbol 718. In one instance, the system can apply different policies to different recipient types. For example, users can have read only access, or read/write access, etc. When the user starting the collaboration or adding resources and members to a collaboration using the user interface in FIG. 7, presses the submit button 720, the sharing engine on the client-side initiates the sharing procedure which include generating invite message and send the invite messages to intermediary engine. FIG. 8 present user interface elements 801 and 803 to view one or more invitation messages sent by a user. The user can press the renew invite button to send the renew invite button 803.

We now present "user" API methods that can implements method of the sharing engine on the client-side.

User API

/Users/Send_Auth_Code

The send_auth_code creates or updates a unique user record in the system with the provided email. The method generates an authorization (or auth) code, stores it in the user record, and sends it to the provided email.

/Users/Sign_in

The sign_in method sets a session cookie and provides a session token to a client in exchange for authenticating with an auth code, email & password pair, or session cookie & session token pair.

/Users/Sign Out

The sign_out method revokes a session cookie & session token pair associated with a user. The system can revoke the session cookie & session token pair by invalidating the session cookie and/or session token. In some embodiments, the system can revoke all session cookie & session token pairs associated with the user.

/Users/Delete

The delete method deletes a user from the system that is associated with a session cookie & session token pair. In some embodiments, the system can revoke all applications associated with the user.

/Users/Update

The update method updates the user record associated with a session cookie & session token pair.

/Users/Get

The gets method gets the user associated with a session cookie & session token pair.

/Users/Clouds/Authorize

The authorize method redirect to/accounts/authorize method using values provided by the system for the client identifier and redirect URI. The values provided are associated with an application registered with the system. In some embodiments, a system client identifier is passed through the redirect, which identifies the application registered with the system. In some embodiments, an invite token is passed through the redirect, which is associated with a pending membership to a collaboration. The invite token permits the user to accept the pending membership and associate it with the system account being authorized.

/Users/Clouds/Token

The token method can call/accounts/token method to exchange an account code or account token for a new account token, and then store the new account token in a user record associated with a session cookie & session token pair. In some embodiments, the system can also call/accounts/get to get the latest metadata for the system account associated with the new account token, and then store this in the user record as well.

/Users/Clouds/Remove

The remove method can call/accounts/revoke method to revoke the account associated with an account token, and then remove this information from a user record associated with a session cookie & session token pair. In some embodiments, the system can revoke all accounts associated with the same application and system account as the account token.

Network Configuration

Figure 9:
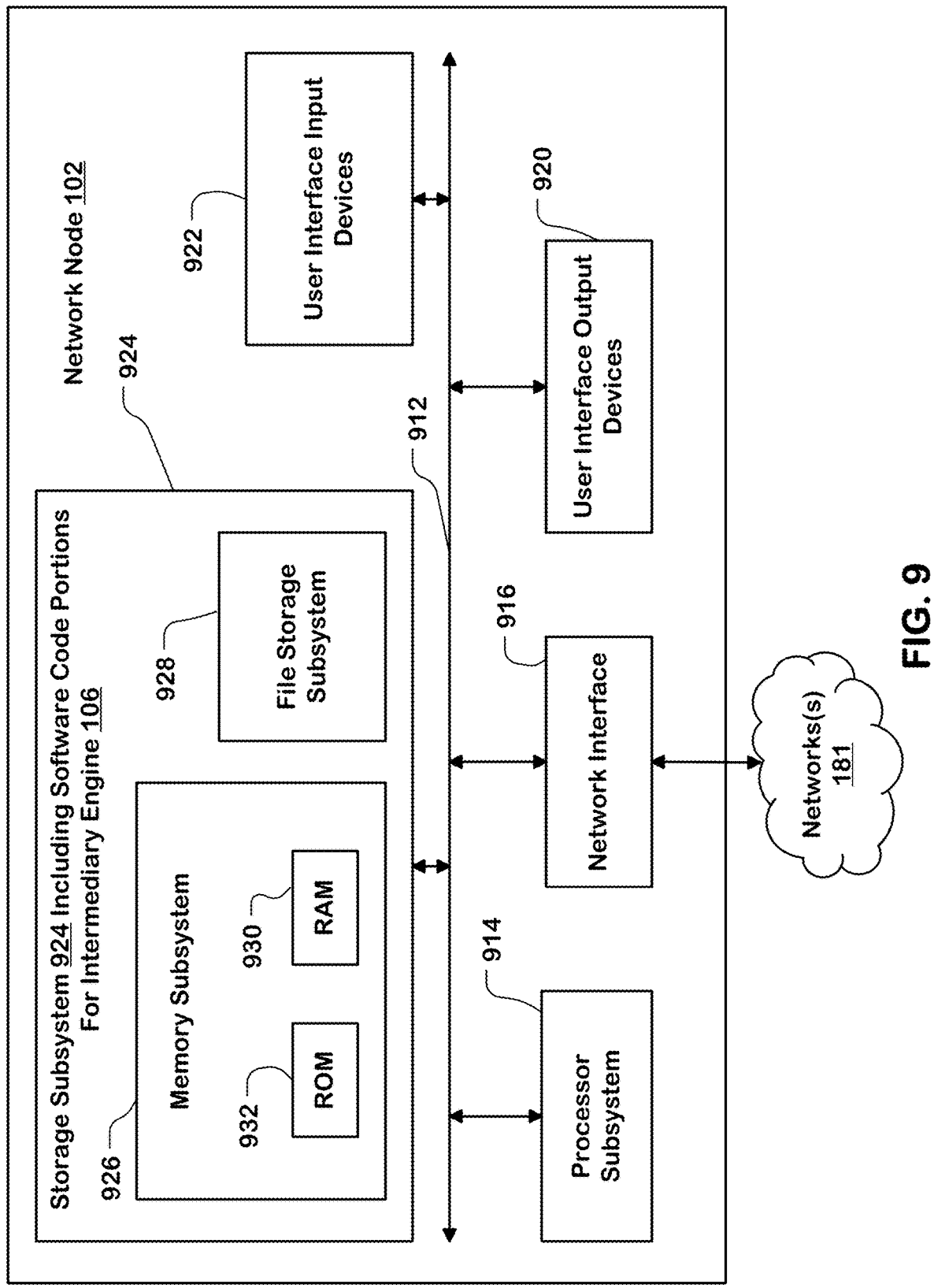
FIG. 9 is a computer hardware arrangement configured for hosting the intermediary engine of FIG. 1.

FIG. 9 presents an architecture of a network hosting the intermediary engine 106 which is hosted on the network node 102. The system can include a plurality of network nodes implementing the intermediary engine. The network node hosting the intermediary engine is connected to network(s) 181.

Storage subsystem 924 stores the basic programming and data constructs that provide the functionality of certain embodiments of the present invention. For example, the various modules implementing the functionality of the intermediary engine 106 may be stored in storage subsystem 924. The storage subsystem 924 is an example of a computer readable memory comprising a non-transitory data storage medium, having computer instructions stored in the memory executable by a computer to perform all or any combination of the sharing and syncing functions described herein, including logic to share resources with members of a membership, link storage accounts of users in multiple storage systems with members in the membership, applying policies to collaboration, receiving notifications of changes to copies of shared resources, detecting changes by calculating content hash and syncing master copy of shared resource to copies of members with older versions of the shared resource by processes as described herein. In other examples, the computer instructions can be stored in other types of memory, including portable memory, that comprise a non-transitory data storage medium or media, readable by a computer.

These software modules are generally executed by a processor subsystem 914. A host memory subsystem 926 typically includes a number of memories including a main random access memory (RAM) 930 for storage of instructions and data during program execution and a read-only memory (ROM) 932 in which fixed instructions are stored. In one embodiment, the RAM 930 is used as a buffer for storing.

A file storage subsystem 928 provides persistent storage for program and data files. The storage subsystem 928 can include solid state disks (SSD) in a RAID 0 (redundant array of independent disks) arrangement, and/or the hard disk drive (HDD) which is slower in access speed than the RAID 0 storage. The solid state disk (SSD) can contain the operating system and related files for the intermediary engine 106.

The processor subsystem 914, the storage subsystem 924, user interface input devices 922, user interface output devices 920, communicate using the bus subsystem 912.

A network interface subsystem 916 is connected to the bus subsystem 912 forming part of the network node (or processing platform) 102. Network interface subsystem 916 provides an interface to outside networks, including an interface to corresponding interface devices in other computer systems. The network interface subsystem 916 allows the processing platform to communicate over the network either by using cables (or wires) or wirelessly. A number of peripheral devices such as user interface output devices and user interface input devices are also connected to the bus subsystem 912 forming part of the network node 102. There may be additional subsystems and devices forming part of the network node but are intentionally not shown in FIG. 9 to improve the clarity of the description. Although bus subsystem 912 is shown schematically as a single bus, alternative embodiments of the bus subsystem may use multiple busses.

Particular Implementations

In various embodiments, the system for sharing and syncing of shared resources described above also includes one or more of the following features.

Cloud Task Manager API

The cloud task manager API can include the following methods.

startTask

Determines one or more next tasks needed to keep a system account active and synced with the system, and then performs one or more of the next tasks. The next tasks can include calling updateTokens, updateWebhook, updateEvents, and/or updateFiles from the Cloud Task Manager API. In some embodiments, the system can limit the number of tasks to perform for any given call to the startTask method based on the number of calls that would need to be made to the Cloud API for a given system account.

In some embodiments, the system can restart the startTask method of the Cloud Task Manager API until there are no more next tasks to perform. In some embodiments, the system can restart the startTask method until there are no more next tasks to perform for a number of subsequent calls to the startTask method. In some embodiments, the system can restart the startTask method after a delay. In some embodiments, the delay increases with each subsequent call to the startTask method, up to a max value.

updateTokens

Determines whether a system account has expired authorization data that needs to be refreshed, and then refreshes the expired authorization data by calling the updateToken method of the Cloud API. In some embodiments, the system can refresh authorization data before it is expired.

The system removes authorization data from the cloud record associated with the system account if a call to the updateToken method of the Cloud API results in an isInvalidToken error.

updateWebhook

Determines whether a system account has an expired webhook that needs to be refreshed, and then refreshes the expired webhook by calling the refreshWebhook method of the Cloud API. In some embodiments, the system only calls the updateWebhook method of the Cloud Task Manager API if no authorization data needed to be refreshed.

updateEvents

Determines whether a system account has new changes by calling the getEvents method of the Cloud API, and then updates the file records in the system based on the new changes. In some embodiments, the system only calls the updateEvents method of the Cloud Task Manager API if no webhook needed to be refreshed. In some embodiments, the system can skip checking for new changes for a period of time after retrieving the latest change.

In some embodiments, after catching up with the latest changes, the system can update the cloud record associated with the system account with the latest metadata by calling the getCloudMetadata method of the Cloud API.

File Task Manager API startTask

Determines one or more next tasks needed to keep a file of a system account synced with the system, and then performs one or more of the next tasks. The next tasks can include calling updateRemoteMetadata, updateRemoteContents, and/or updateLocalContents from the File Task Manager API. In some embodiments, the system can limit the number of tasks to perform for any given call to the startTask method based on the number of calls that would need to be made to the Cloud API for a given system account.

updateRemoteMetadata

Updates a file record on the system with the latest metadata from a system account by calling the loadMetadata method of the Cloud API. In some embodiments, the system can determine a parent file record for the file record, and then update the file record and/or the parent file record accordingly.

updateRemoteContents

Updates the child file records of a parent file record on the system with the latest metadata from a system account by calling the loadContents method of the Cloud API.

updateLocalContents

Updates the child file records of a parent file record on the system with the latest metadata from the parent file record. In some embodiments, the system can determine which file records exist in the system but were not found on an associated system account in a preceding call to updateRemoteContents. This can happen when access to a system account is revoked from the system and then reactivated after a period of time. In this case, the system can set a stale metadata time attribute on each stale file record. The stale metadata time attribute instructs the system that at some point, based on the priority of other tasks, to launch a task from the updateFiles method of the Cloud Task Manager API that calls the updateRemoteMetadata method of the File Task Manager API for a stale file record.

Membership Task Manager startTask

Determines one or more next tasks needed to keep a membership synced with the system, and then performs one or more of the next tasks. The next tasks can include: (1) updating file records along the membership path when the membership is revoked or the associated file is moved, which helps inform the system to prioritize tasks related to files associated with the membership; (2) updating file records associated with the membership when the membership is revoked, which instructs the system to stop syncing the files associated with the membership; (3) updating file records associated with the membership when associated policies change, which helps inform the system to the policies associated with a file without having to query one or more additional records besides the associated file record; (4) updating file records associated with the membership when the status of the membership changes, which helps inform the system to the status of a membership without having to query an additional record besides the associated file record; (5) updating the source file records associated with a collaboration when the membership is activated or reactivated, which instructs the system to sync the differences between the source files associated with the collaboration and the files associated with the membership, where there is a source resource for every shared system resource, and where the source resource is associated with a membership in the collaboration and serves as a source of truth for the data associated with a shared system resource.

Any data structures and code described or referenced above are stored according to many implementations in computer readable memory, which comprises a non-transitory computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of syncing a shared resource across multiple systems using an intermediary system including:
    storing a membership database that includes a plurality of members in a membership, a member in the membership linked to a copy of the shared resource identified by a file identifier wherein the file identifier is a combination of a sync identifier common for copies of the shared resource for the plurality of members and a membership identifier of a member in the plurality of members;
    creating a reference content hash for the shared resource of the membership; linking to cloud-based storage accounts for members in the membership to receive notifications for transactions with respective copies of the shared resource;
    downloading, upon receiving a notification for transaction with a copy of the shared resource, the content hash of the copy of the shared resource for comparison with the reference content hash of the shared resource and detecting a change in the downloaded content hash, downloading the copy of the shared resource as a master copy; and
    fanning out the master copy to update copies of shared resource in cloud-based storage accounts for members in the membership by selecting a first subset of members in the membership, and uploading the master copy to replace respective copies of shared resource on cloud-based storage accounts of the first subset of members, repeating the selecting of subset of members and the uploading of master copy until the copies of shared resource for all members in the membership are updated.

2. The method of claim 1, wherein fanning out the master copy includes initiating at least two parallel fan outs by downloading at least two updated copies of shared resource and using the updated copies as master copies to update copies of shared resources for members in the membership.

3. The method of claim 1, further including,
    receiving a membership invite from a member in the plurality of members for a user to join a membership to collaborate on the shared resource;
    sending the membership invite to the user;
    receiving an accept membership message from the user in response to the membership invite; and
    adding the user in the membership database as a new member and downloading the shared resource to the cloud-based storage account linked to the new member.

4. The method of claim 1, further including,
    receiving a notification of a new shared resource from a member in the membership for collaboration; and
    downloading a copy of the new shared resource from the cloud-based storage account of the member as a master copy to fanout to other members in the membership.

5. The method of claim 1, further including, setting policy for a member in the plurality of members in a membership wherein the policy includes access privileges for the member.

6. The method of claim 5, wherein the access privilege in the policy allows the member to read content from the shared resource and write content to the shared resource.

7. The method of claim 5, wherein the access privilege in the policy allows the member to only read content from the shared resource.

8. The method of claim 1, further including, setting a policy for a group of members in a membership wherein the policy includes access privileges for the group of members in the membership.

9. The method of claim 1, wherein linking to cloud-based storage accounts further includes accessing authorization data for members in the membership from a system account database to access the cloud-based storage accounts associated with the member.

10. A method of syncing a shared resource at a plurality of client-side nodes in a network including the plurality of client-side nodes and a server-side node hosting an intermediary system, the method including:
    storing a membership database that includes a plurality of members in a membership on respective client-side nodes, a member in the membership linked to a copy of the shared resource identified by a file identifier;
    creating a reference content hash for the shared resource of the membership;
    linking to cloud-based storage account for members in the membership to receive notifications at the server-side node for transactions of members at respective client-side nodes with respective copies of the shared resource;
    downloading at the server-side node, upon receiving a notification for a transaction with a copy of the shared resource, the content hash of the copy of the shared resource for comparison with the reference content hash of the shared resource and detecting a change in the downloaded content hash, downloading at the server-side node, the copy of the shared resource as a master copy; and
    fanning out the master copy to update copies of shared resource in cloud-based storage accounts for members in the membership by selecting a first subset of members in the membership, and uploading the master copy to replace respective copies of shared resource on cloud-based storage accounts of the first subset of members, repeating the selecting the subsets of members and the uploading the master copy until the copies of shared resource for all members in the membership are updated.

11. A system including one or more processors coupled to memory, the memory loaded with computer instructions to sync a shared resource across multiple systems using an intermediary system, the instructions, when executed on the processors, implement actions comprising:
    storing a membership database that includes a plurality of members in a membership, a member in the membership linked to a copy of the shared resource identified by a file identifier wherein the file identifier is a combination of a sync identifier common for copies of the shared resource for the plurality of members and a membership identifier of a member in the plurality of members;

creating a reference content hash for the shared resource of the membership; linking to cloud-based storage accounts for members in the membership to receive notifications for transactions with respective copies of the shared resource;

downloading, upon receiving a notification for transaction with a copy of the shared resource, the content hash of the copy of the shared resource for comparison with the reference content hash of the shared resource and detecting a change in the downloaded content hash, downloading the copy of the shared resource as a master copy; and fanning out the master copy to update copies of shared resource in cloud-based storage accounts for members in the membership by selecting a first subset of members in the membership, and uploading the master copy to replace respective copies of shared resource on cloud-based storage accounts of the first subset of members, repeating the selecting of subset of members and the uploading of master copy until the copies of shared resource for all members in the membership are updated.

12. The system of claim 11, wherein fanning out the master copy includes initiating at least two parallel fan outs by downloading at least two updated copies of shared resource and using the updated copies as master copies to update copies of shared resources for members in the membership.

13. The system of claim 11, further implementing actions comprising:

receiving a membership invite from a member in the plurality of members for a user to join a membership to collaborate on the shared resource;

sending the membership invite to the user;

receiving an accept membership message from the user in response to the membership invite; and adding the user in the membership database as a new member and downloading the shared resource to the cloud-based storage account linked to the new member.

14. The system of claim 11, further implementing actions comprising, receiving a notification of a new shared resource from a member in the membership for collaboration; and downloading a copy of the new shared resource from the cloud-based storage account of the member as a master copy to fanout to other members in the membership.

15. The system of claim 11, further implementing actions comprising, setting policy for a member in the plurality of members in a membership wherein the policy includes access privileges for the member.

16. The system of claim 15, wherein the access privilege in the policy allows the member to read content from the shared resource and write content to the shared resource.

17. The system of claim 15, wherein the access privilege in the policy allows the member to only read content from the shared resource.

18. The system of claim 11, further implementing actions comprising, setting a policy for a group of members in a membership wherein the policy includes access privileges for the group of members in the membership.

19. The system of claim 11, wherein linking to cloud-based storage accounts further includes accessing authorization data for members in the membership from a system account database to access the cloud-based storage accounts associated with the member.

20. A system including one or more processors coupled to memory, the memory loaded with computer instructions to sync a shared resource at a plurality of client-side nodes in a network including the plurality of client-side nodes and a server-side node hosting an intermediary system, the instructions, when executed on the processors, implement actions comprising:

storing a membership database that includes a plurality of members in a membership on respective client-side nodes, a member in the membership linked to a copy of the shared resource identified by a file identifier;

creating a reference content hash for the shared resource of the membership;

linking to cloud-based storage account for members in the membership to receive notifications at the server-side node for transactions of members at respective client-side nodes with respective copies of the shared resource;

downloading at the server-side node, upon receiving a notification for a transaction with a copy of the shared resource, the content hash of the copy of the shared resource for comparison with the reference content hash of the shared resource and detecting a change in the downloaded content hash, downloading at the server-side node, the copy of the shared resource as a master copy; and fanning out the master copy to update copies of shared resource in cloud-based storage accounts for members in the membership by selecting a first subset of members in the membership, and uploading the master copy to replace respective copies of shared resource on cloud-based storage accounts of the first subset of members, repeating the selecting the subsets of members and the uploading the master copy until the copies of shared resource for all members in the membership are updated.

21. A non-transitory computer readable storage medium impressed with computer program instructions to sync a shared resource across multiple systems using an intermediary system, the instructions, when executed on a processor, implement a method comprising:

storing a membership database that includes a plurality of members in a membership, a member in the membership linked to a copy of the shared resource identified by a file identifier wherein the file identifier is a combination of a sync identifier common for copies of the shared resource for the plurality of members and a membership identifier of a member in the plurality of members;

creating a reference content hash for the shared resource of the membership;

linking to cloud-based storage accounts for members in the membership to receive notifications for transactions with respective copies of the shared resource;

downloading, upon receiving a notification for transaction with a copy of the shared resource, the content hash of the copy of the shared resource for comparison with the reference content hash of the shared resource and detecting a change in the downloaded content hash, downloading the copy of the shared resource as a master copy; and fanning out the master copy to update copies of shared resource in cloud-based storage accounts for members in the membership by selecting a first subset of members in the membership, and uploading the master copy to replace respective copies of shared resource on cloud-based storage accounts of the first subset of members, repeating the selecting of subset of members and the uploading of master copy until the copies of shared resource for all members in the membership are updated.

22. The non-transitory computer readable storage medium of claim 21, wherein fanning out the master copy includes initiating at least two parallel fan outs by downloading at least two updated copies of shared resource and using the updated copies as master copies to update copies of shared resources for members in the membership.

23. The non-transitory computer readable storage medium of claim 21, implementing the method further comprising:
receiving a membership invite from a member in the plurality of members for a user to join a membership to collaborate on the shared resource;
sending the membership invite to the user;
receiving an accept membership message from the user in response to the membership invite; and
adding the user in the membership database as a new member and downloading the shared resource to the cloud-based storage account linked to the new member.

24. The non-transitory computer readable storage medium of claim 21, implementing the method further comprising:
receiving a notification of a new shared resource from a member in the membership for collaboration; and
downloading a copy of the new shared resource from the cloud-based storage account of the member as a master copy to fanout to other members in the membership.

25. The non-transitory computer readable storage medium of claim 21, implementing the method further comprising:
setting policy for a member in the plurality of members in a membership wherein the policy includes access privileges for the member.

26. The non-transitory computer readable storage medium of claim 25, wherein the access privilege in the policy allows the member to read content from the shared resource and write content to the shared resource.

27. The non-transitory computer readable storage medium of claim 25, wherein the access privilege in the policy allows the member to only read content from the shared resource.

28. The non-transitory computer readable storage medium of claim 21, further including, setting a policy for a group of members in a membership wherein the policy includes access privileges for the group of members in the membership.

29. The non-transitory computer readable storage medium of claim 21, wherein linking to cloud-based storage accounts further includes accessing authorization data for members in the membership from a system account database to access the cloud-based storage accounts associated with the member.

30. A non-transitory computer readable storage medium impressed with computer program instructions to sync a shared resource at a plurality of client-side nodes in a network including the plurality of client-side nodes and a server-side node hosting an intermediary system, the instructions, when executed on a processor, implement a method comprising:
storing a membership database that includes a plurality of members in a membership on respective client-side nodes, a member in the membership linked to a copy of the shared resource identified by a file identifier;
creating a reference content hash for the shared resource of the membership;
linking to cloud-based storage account for members in the membership to receive notifications at the server-side node for transactions of members at respective client-side nodes with respective copies of the shared resource;
downloading at the server-side node, upon receiving a notification for a transaction with a copy of the shared resource, the content hash of the copy of the shared resource for comparison with the reference content hash of the shared resource and detecting a change in the downloaded content hash, downloading at the server-side node, the copy of the shared resource as a master copy; and
fanning out the master copy to update copies of shared resource in cloud-based storage accounts for members in the membership by selecting a first subset of members in the membership, and uploading the master copy to replace respective copies of shared resource on cloud-based storage accounts of the first subset of members, repeating the selecting the subsets of members and the uploading the master copy until the copies of shared resource for all members in the membership are updated.

* * * * *